US006990458B2

(12) United States Patent
Harrison et al.

(10) Patent No.: US 6,990,458 B2
(45) Date of Patent: Jan. 24, 2006

(54) SYSTEM AND METHOD FOR COMPUTER-AIDED TECHNICIAN DISPATCH AND COMMUNICATION

(75) Inventors: Clifford A. Harrison, Denver, CO (US); Emery J. Weber, Denver, CO (US); Phillip M. Bush, Denver, CO (US)

(73) Assignee: CSG Systems, Inc., Englewood, CO (US)

( * ) Notice: Subject to any disclaimer, the term of this patent is extended or adjusted under 35 U.S.C. 154(b) by 0 days.

(21) Appl. No.: 08/919,450

(22) Filed: Aug. 28, 1997

(65) Prior Publication Data

US 2003/0069797 A1    Apr. 10, 2003

(51) Int. Cl.
*G06F 17/60*    (2006.01)
(52) U.S. Cl. .................. 705/8; 705/9; 700/99; 700/100
(58) Field of Classification Search .................. 705/22, 705/32, 412, 8–9; 455/18, 31.2, 66, 3.1, 455/3.3, 4.2; 379/21, 93.25, 90.01, 45; 700/99–100; G06F 17/60
See application file for complete search history.

(56) References Cited

U.S. PATENT DOCUMENTS

| 4,390,968 A | 6/1983 | Hennessy et al. |
| 4,455,619 A | 6/1984 | Masui et al. |
| 4,459,678 A | 7/1984 | McCaskill et al. |
| 4,484,304 A | 11/1984 | Anderson et al. |
| 4,512,033 A | 4/1985 | Schrock |
| 4,558,413 A | 12/1985 | Schmidt et al. |
| 4,651,279 A | 3/1987 | Suzuki |
| 4,694,396 A | 9/1987 | Weisshaar et al. |
| 4,698,752 A | 10/1987 | Goldstein et al. |
| 4,714,996 A | 12/1987 | Gladney et al. |
| 4,716,410 A | 12/1987 | Nozaki |
| 4,731,734 A | 3/1988 | Gruner et al. |
| 4,742,467 A | 5/1988 | Messerich et al. |

(Continued)

FOREIGN PATENT DOCUMENTS

CA    1276730    * 5/1988

(Continued)

OTHER PUBLICATIONS

Collins et al., "Automated Asignment and Scheduling of Service Personnel" IEEE Expert, vol. 9, No. 2, Apr. 1994, pp. 33-39.Apr.*

(Continued)

*Primary Examiner*—Cuong Nguyen
(74) *Attorney, Agent, or Firm*—Gary R. Jarosik

(57) ABSTRACT

A system for computer aided technician dispatch and communication includes a communications system linking a plurality of subscribers, a team of technicians, a service representative, and a user. An input terminal receives information, the information includes service request information from the plurality of subscribers (116), and work order information from the team of technicians. The system, also includes a server coupled to the input terminals for processing the information and generating a graphical representation of the information, and, a display for receiving the graphical representation and presenting the graphical representation to a user. A method for computer aided technician dispatch and communication includes communicating with a plurality of subscribers and a team of technicians and receiving information, the information including service request information from the subscriber and work order information from the team of technicians. The method also includes entering the information in an input terminal coupled to a server processing the information, the processing resulting in a graphical representation of the information and displaying the graphical representation to a user.

12 Claims, 8 Drawing Sheets

U.S. PATENT DOCUMENTS

| | | | |
|---|---|---|---|
| 4,809,170 A | 2/1989 | Leblang et al. | |
| 4,811,207 A | 3/1989 | Hikita et al. | |
| 4,853,843 A | 8/1989 | Ecklund | |
| 4,864,497 A | 9/1989 | Lowry et al. | |
| 4,864,569 A | 9/1989 | DeLucia et al. | |
| 4,882,674 A | 11/1989 | Quint et al. | |
| 4,914,570 A | 4/1990 | Peacock | |
| 4,932,026 A | 6/1990 | Dev et al. | |
| 4,937,743 A * | 6/1990 | Rassman et al. | 705/8 |
| 4,951,192 A | 8/1990 | Chase, Jr. et al. | |
| 5,012,405 A | 4/1991 | Nishikado et al. | |
| 5,018,096 A | 5/1991 | Aoyama | |
| 5,032,979 A | 7/1991 | Hecht et al. | |
| 5,043,878 A | 8/1991 | Ooi | |
| 5,065,393 A | 11/1991 | Sibbitt et al. | |
| 5,073,933 A | 12/1991 | Rosenthal | |
| 5,099,431 A * | 3/1992 | Natarajan | 705/8 |
| 5,113,519 A | 5/1992 | Johnson et al. | |
| 5,122,959 A | 6/1992 | Nathanson et al. | 701/117 |
| 5,127,099 A | 6/1992 | Zifferer et al. | |
| 5,129,084 A | 7/1992 | Kelly, Jr. et al. | |
| 5,136,291 A | 8/1992 | Teague | |
| 5,136,712 A | 8/1992 | Perazzoli, Jr. et al. | |
| 5,155,847 A | 10/1992 | Kirouac et al. | |
| 5,177,684 A * | 1/1993 | Harker et al. | 701/117 |
| 5,179,657 A | 1/1993 | Dykstal et al. | |
| 5,187,788 A | 2/1993 | Marmelstein | |
| 5,197,004 A * | 3/1993 | Sobotka et al. | 705/1 |
| 5,204,812 A | 4/1993 | Kasiraj et al. | |
| 5,218,701 A | 6/1993 | Miyazaki | |
| 5,220,501 A | 6/1993 | Lawlor et al. | |
| 5,220,604 A | 6/1993 | Gasser et al. | |
| 5,227,967 A | 7/1993 | Bailey | |
| 5,230,072 A | 7/1993 | Smith et al. | |
| 5,237,691 A | 8/1993 | Robinson et al. | |
| 5,241,465 A * | 8/1993 | Oba et al. | 705/8 |
| 5,251,317 A | 10/1993 | Iizuka et al. | |
| 5,255,181 A * | 10/1993 | Chapman et al. | 705/8 |
| 5,261,042 A | 11/1993 | Brandt | |
| 5,261,102 A | 11/1993 | Hoffman | |
| 5,263,147 A | 11/1993 | Francisco et al. | |
| 5,263,165 A | 11/1993 | Janis | |
| 5,263,167 A | 11/1993 | Conner, Jr. et al. | |
| 5,265,221 A | 11/1993 | Miller | |
| 5,271,007 A | 12/1993 | Kurahashi et al. | |
| 5,274,806 A | 12/1993 | Hill | |
| 5,276,869 A | 1/1994 | Forrest et al. | |
| 5,276,870 A | 1/1994 | Shan et al. | |
| 5,276,901 A | 1/1994 | Howell et al. | |
| 5,280,619 A | 1/1994 | Wang | |
| 5,287,270 A | 2/1994 | Hardy et al. | |
| 5,289,371 A | 2/1994 | Abel et al. | |
| 5,291,598 A | 3/1994 | Grundy | |
| 5,293,422 A | 3/1994 | Loiacono | |
| 5,293,620 A | 3/1994 | Barabash et al. | |
| 5,295,065 A * | 3/1994 | Chapman et al. | 705/8 |
| 5,295,222 A | 3/1994 | Wadhwa et al. | |
| 5,297,283 A | 3/1994 | Kelly, Jr. et al. | |
| 5,305,440 A | 4/1994 | Morgan et al. | |
| 5,307,495 A | 4/1994 | Seino et al. | |
| 5,317,729 A | 5/1994 | Mukherjee et al. | |
| 5,321,841 A | 6/1994 | East et al. | |
| 5,325,290 A | 6/1994 | Cauffman et al. | |
| 5,325,478 A | 6/1994 | Shelton et al. | |
| 5,335,346 A | 8/1994 | Fabbio | |
| 5,339,403 A | 8/1994 | Parker | |
| 5,339,433 A | 8/1994 | Frid-Nielsen | |
| 5,339,435 A | 8/1994 | Lubkin et al. | |
| 5,343,387 A | 8/1994 | Honma et al. | 705/9 |
| 5,361,349 A | 11/1994 | Sugita et al. | |
| 5,375,244 A | 12/1994 | McNair | |
| 5,377,259 A * | 12/1994 | Butler et al. | 379/93.25 |
| 5,396,621 A | 3/1995 | MacGregor et al. | |
| 5,404,508 A | 4/1995 | Konrad et al. | |
| 5,404,523 A | 4/1995 | DellaFera et al. | |
| 5,408,652 A | 4/1995 | Hayashi et al. | |
| 5,414,812 A | 5/1995 | Filip et al. | |
| 5,428,546 A | 6/1995 | Shah et al. | 701/207 |
| 5,428,795 A | 6/1995 | Johnson et al. | |
| 5,432,934 A | 7/1995 | Levin et al. | |
| 5,440,730 A | 8/1995 | Elmasri et al. | |
| 5,446,886 A | 8/1995 | Li | |
| 5,446,903 A | 8/1995 | Abraham et al. | |
| 5,450,581 A | 9/1995 | Bergen et al. | |
| 5,450,593 A | 9/1995 | Howell et al. | |
| 5,452,450 A | 9/1995 | Delory | |
| 5,459,860 A | 10/1995 | Burnett et al. | |
| 5,463,774 A | 10/1995 | Jenness | |
| 5,467,268 A * | 11/1995 | Sisley et al. | 705/9 |
| 5,469,556 A | 11/1995 | Clifton | |
| 5,469,576 A | 11/1995 | Dauerer et al. | |
| 5,481,700 A | 1/1996 | Thuraisingham | |
| 5,493,682 A | 2/1996 | Tyra et al. | |
| 5,495,610 A | 2/1996 | Shing et al. | |
| 5,499,357 A | 3/1996 | Sonty et al. | |
| 5,499,371 A | 3/1996 | Henninger et al. | |
| 5,504,814 A | 4/1996 | Miyahara | |
| 5,513,348 A | 4/1996 | Ryu et al. | |
| 5,515,531 A | 5/1996 | Fujiwara et al. | |
| 5,524,253 A | 6/1996 | Pham et al. | |
| 5,528,677 A | 6/1996 | Butler et al. | |
| 5,528,757 A | 6/1996 | Yamasaki | |
| 5,539,906 A | 7/1996 | Abraham et al. | |
| 5,541,991 A | 7/1996 | Benson et al. | |
| 5,544,303 A | 8/1996 | Maroteaux et al. | |
| 5,544,320 A | 8/1996 | Konrad | |
| 5,551,027 A | 8/1996 | Choy et al. | |
| 5,552,776 A | 9/1996 | Wade et al. | |
| 5,553,239 A | 9/1996 | Heath et al. | |
| 5,560,005 A | 9/1996 | Hoover et al. | |
| 5,560,008 A | 9/1996 | Johnson et al. | |
| 5,561,795 A | 10/1996 | Sarkar | |
| 5,572,438 A * | 11/1996 | Ehlers et al. | 364/528.3 |
| 5,574,898 A | 11/1996 | Leblang et al. | |
| 5,581,758 A | 12/1996 | Burnett et al. | |
| 5,590,269 A * | 12/1996 | Kruse et al. | 705/9 |
| 5,590,274 A | 12/1996 | Skarpelos et al. | |
| 5,606,693 A | 2/1997 | Nilsen et al. | |
| 5,623,404 A * | 4/1997 | Collins et al. | 705/9 |
| 5,737,728 A * | 4/1998 | Sisley et al. | 705/8 |
| 5,761,278 A * | 6/1998 | Pickett et al. | 379/90.01 |
| 5,764,953 A * | 6/1998 | Collins et al. | 395/500 |
| 5,943,652 A * | 8/1999 | Sisley et al. | 705/9 |
| 6,272,467 B1 * | 8/2001 | Durand et al. | 705/26 |

FOREIGN PATENT DOCUMENTS

| | | | |
|---|---|---|---|
| US | 8606569 | * | 10/1988 |
| US | 0400789 | * | 12/1990 |
| US | 9207439 | * | 11/1992 |
| WO | 9103118 | * | 4/1992 |

OTHER PUBLICATIONS

J.E. Collins and E.M. Sisley, "AI in Field Service; The Dispatch Advisor" in Workshop Notes, AI in Service and Support: Bridging the Gap Between Research and Applications, 11th National Conf. on AI, Wash. DC., Jul. 11-15, 1993, pp. 26-37.*

T. Dean and M. Boddy, "An Analysis of Time-Dependent Planning" in Proc. of the 7th National Conf. of AI A.A.A.I., 1988, pp. 49-54.*

E. Ghalichi and J. Collins, "The Dispatch Advisor-Merging Optimization and Al Technologies to Dispatch Service Technicians," in Proc. Workshop on Al for Customer Service & Support, 8th IEEE Conf. on Al Applications, Monterey, California, Mar. 3, 1992, pp.*

A. V. Hill, "An Experimental Comparison of Dispatching Rules for Field Service Support", Decision Sciences, vol. 23, No. 1, Winter 1992, pp. 235-249.*

P. Prosser, "A Reactive Scheduling Agent" in Proc. of the 11th International Joint Conf. on Al, Detroit, Michigan, Aug. 20-25, 1989, pp. 1004-1009.*

J. Tsitsiklis, "Special Cases of Traveling Salesman and Repairman Problems with Time Windows," Report LIDS-P-1987, Massachusetts Institute of Technology, Jun. 1990, pp. 1-23.*

Hill et al. "Scat & Spat: Large-scale computer-based optimization systems for the personnel assignment problem" in Decision Sciences, vol. 14, No. 2, Apr. 1983, pp. 207-220.*

Collins et al., "Automated Asignment and Scheduling of Service Personnel" IEEE Expert, vol. 9, No. 2, Apr. 1994, pp. 33-39.*

J.E. Collins and E.M. Sisley, "Al in Field Service: The Dispatch Advisor" in Workshop Notes, Al in Service and Support: Bridging the Gap Between Research and Applications, 11th National Conf. on Al, Wash. DC., Jul. 11-15, 1993, pp. 26-37.*

T. Dean and M. Boddy, "An Analysis of Time-Dependent Planning" in Proc. of the 7th National Conf. of Al A.A.A.I., 1988, pp. 49-54.*

E. Ghalichi and J. Collins, "The Dispatch Advisor-Merging Optimization and Al Technologies to Dispatch Service Technicians," in Proc. Workshop on Al for Customer Service & Support, 8th IEEE Conf. on Al Applications, Monterey, California, Mar. 3, 1992, pp.*

A. V. Hill, "An Experimental Comparisonof Dispatching Rules for Field Service Support", Decision Sciences, vol. 23, No. 1, Winter 1992, pp. 235-249.*

P. Prosser, "A Reactive Scheduling Agent" in Proc. of the 11th International Joint Conf. on Al, Detroit, Michigan, Aug. 20-25, 1989, pp. 1004-1009.*

J. Tsitsiklis, "Special Cases of Traveling Salesman and Repairman Problems with Time Windows," Report LIDS-P-1987, Massachusetts Institute of Technology, Jun. 1990, pp. 1-23.*

Hill et al. "Scat & Spat: Large-scale computer-based optimization systems for the personnel assignment problem" in Decision Sciences, vol. 14, No. 2, Apr. 1983, pp. 207-220.*

Collins et al., "Automated Asignment and Scheduling of Service Personnel" IEEE Expert, vol. 9, No. 2, Apr. 1994, pp. 33-39.*

J.E. Collins and E.M. Sisley, "Al in Field Service: The Dispatch Advisor" in Workshop Notes, Al in Service and Support: Bridging the Gap Between Research and Applications, 11th National Conf. on Al, Wash. DC., Jul. 11-15, 1993, pp. 26-37.*

T. Dean and M. Boddy, "An Analysis of Time-Dependent Planning" in Proc. of the 7th National Conf. of Al A.A.A.I., 1988, pp. 49-54.*

E. Ghalichi and J. Collins, "The Dispatch Advisor-Merging Optimization and Al Technologies to Dispatch Service Technicians," in Proc. Workshop on Al for Customer Service and Support, 8th IEEE Conf. on Al Applicaitons, Monterey, California, mar. 3, 1992, pp.*

See the continuation sheet.*

D.G. Shin, et al., "Achieiving Inoperability between Heterogeneous Object-Oriented Genomic Databases," Proceedings of the 27th Annual Hawaii Int'l Conf. on System Sciences, (Nov. 12, 1994).

E.B. Fernandez, et al., "A Security Model for Object-Oriented Databases," Department of Electrical and Computer Engineering, Florida Atlantic University (Boca Raton, Florida, 33431), (Nov. 12, 1989).

J. Martin, et al., "DB2: Concepts, Designs, and Programming," Prentice Hall, (Nov. 12, 1989).

W. Cellary, et al.; "Locking in DAG-STructured Databases", Microprocessing and Microprogramming 39, 1993; pp. 161-164.

S.I. Feldman; "Make—A Program for Maintaining Computer Programs", Software-Practice and Experience, vol. 9, 199, pp. 255-265.

D. Perelman-Hall; "Directed acyclic Graph Unification: An Object-Oriented Approach to Buildign Constraint Systems", Dr. Dobb's Journal, v. 20, 1995, pp. 44.

M. H. Eich; "Graph Directed Locking", IEE Transactions on Software Engineering, v. 14, No. 2, 1998, pp. 133-140.

J. Malone; "John Malone Discusses the Future of the Communications Industry", Information Access Co., 1997.

"The Construction of AS Network on the Whole Company", 1994, pp. 50-54.

Batch Processing Can Be A Real Asset; Utilization of idle Time Through Job Scheduling Keeps Management Simple, McGraw-Hill, Inc., 1993.

* cited by examiner

SYSTEM AND METHOD FOR COMPUTER-AIDED TECHNICIAN DISPATCH AND COMMUNICATION

This application is related to the following U.S. patent applications: U.S. patent application Ser. No. 08/919,105, entitled "System and Method for Displaying Dispatch and Work Order Information," filed Aug. 28, 1997; U.S. patent application Ser. No. 08/919,475, entitled "System and Method for Computer-Aided Technician Dispatch," filed Aug. 28, 1997; U.S. patent application Ser. No. 08/919,474, entitled "System and Method for Dispatch List and Map Interaction," filed Aug. 28, 1997; U.S. patent application Ser. No. 08/919,218, entitled "System and Method for Automatic Work Order Routing," filed Aug. 28, 1997; and U.S. patent application Ser. No. 08/919,215, entitled "System and Method for Computer-Aided Technician Dispatch and Tracking," filed Aug. 28, 1997.

FIELD OF THE INVENTION

This invention relates to the field of technician dispatch and more particularly to a system and method for computer-aided technician dispatch and communication.

BACKGROUND OF THE INVENTION

Cable television and subscriber programming systems are well-known in the art. These systems typically consist of a service center and a plurality of subscriber locations, all serviced by a team of technicians. The service center includes a service representative, who is responsible for receiving incoming calls and requests for service. A dispatcher, who is responsible for ensuring that technicians are dispatched to subscriber locations that require service and for monitoring the technicians' progress, coordinates with the customer service representative at the service center site, or may be located at a different location.

As subscribers need assistance, they call the service representative. The service representative typically screens the request, and determines whether or not technician assistance is required. Should technician assistance be required, the service representative generates a work order request. This work order request includes the customer's name, address, telephone number, date of service appointment, current service status, service requested, and other desirable service information. A computer may be used to aid in the input, storage, and transfer of this information. This work order is then forwarded to the dispatcher to assign the work order to a technician.

Typically, the problem of assigning technicians to subscribers and tracking the technicians' progress is solved manually. In a conventional system, the information received by the dispatcher is in a list-based format and not formatted graphically. In the prior art, dispatchers use a conventional map and colored pins to represent the location of work orders and the location of technicians on the map. However, it is difficult to maintain the accuracy of this map throughout the day, as unexpected events may occur that interfere with the tracking of work orders. Further, there is a limit to the amount of information that a dispatcher can import from the map and from a list of job orders. As the day progresses, work order information, such as status, location, technician assigned, etc., may change, and, although this information may be entered in a computer immediately, it may be some time before the map is updated to reflect changes.

SUMMARY OF THE INVENTION

It is therefore an object of this invention to automate both the assignment of technicians to subscribers and monitoring the technician's progress throughout the day. This objective is achieved by providing an integrated computer and display system for conveying information regarding the location of technicians and the status of work orders to a dispatcher graphically.

It is a further object of this invention to represent a work orders as an icon on a display system.

It is a further object of this invention to represent different statuses of a work order as different icons on a display system.

It is a further object of this invention to quickly allow a dispatcher to discern whether a work order represents a specific type of service request such as an outage.

In another embodiment, a system for computer-aided technician dispatch and communication is disclosed. The system comprises a communications system linking a plurality of subscribers, a team of technicians, a service representative, and a user; an input terminal for receiving information, the information comprising service request information from the plurality of subscribers, and work order information from the team of technicians, a server coupled to the input terminals for processing the information and generating a graphical representation of the information, and, a display for receiving the graphical representation and presenting the graphical representation to a user.

In another embodiment, a method for computer aided technician dispatch and communication in accordance with the invention comprises five steps. Those steps are (1) communicating with a plurality of subscribers and a team of technicians; (2) receiving information, the information comprising service request information from the subscriber and work order information from the team of technicians, (3) entering the information in an input terminal, the input terminal coupled to a server; (4) processing the information, the processing resulting in a graphical representation of the information; and (5) displaying the graphical representation to a user.

A technical advantage of the present invention is that a system and method for computer-aided technician dispatch and communication is provided. Another technical advantage is that the invention displays graphical representations of service requests or work orders on a map in accordance with their actual positions. Another technical advantage is that the invention automatically updates the graphical representations as changes to their statuses are recognized. Another technical advantage is that the invention allows technician information to be entered into the database. Another technical advantage is that the invention automatically routes pending, unassigned service requests or work orders in accordance with a predefined algorithm to account for skill and distance factors.

DETAILED DESCRIPTION OF THE PREFERRED EMBODIMENTS

Figure 1:
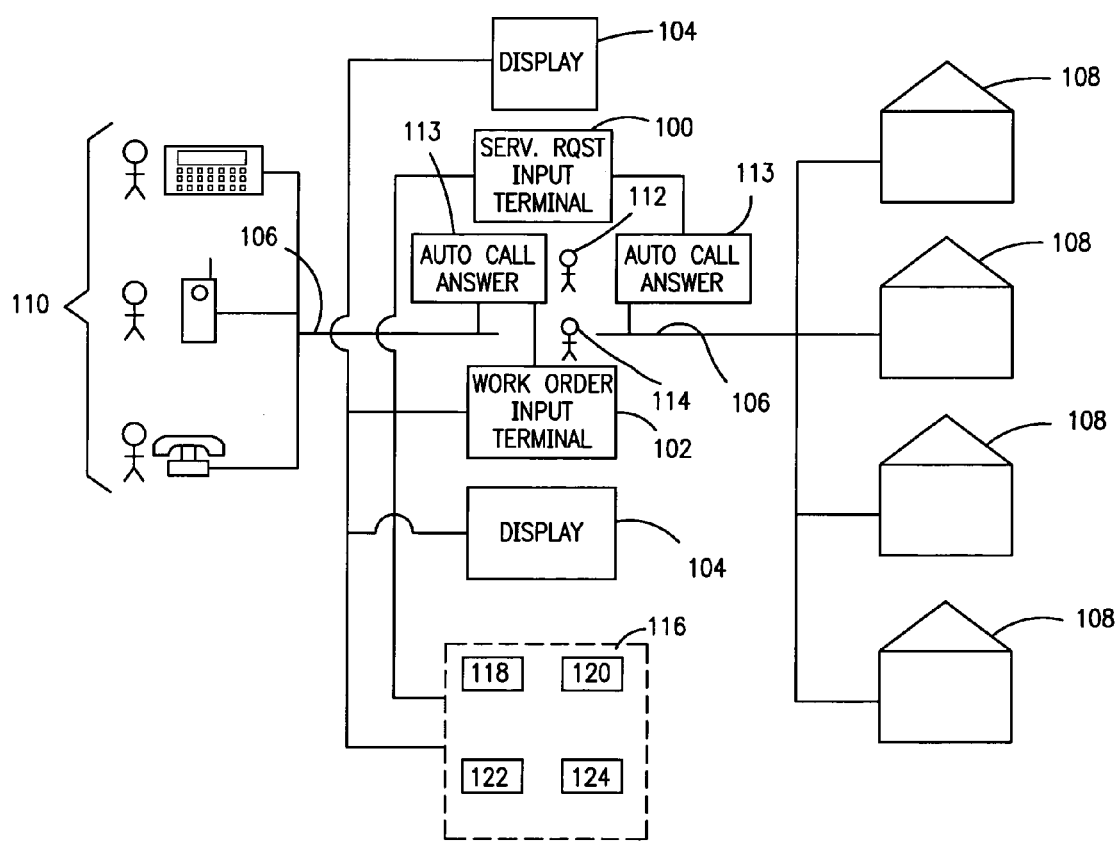
FIG. 1 is a block diagram of a system for computer-aided technician dispatch.

Referring to FIG. 1, which illustrates a block diagram of a system for computer-aided technician dispatch, a subscriber service request input terminal 100 is provided for a user, such as a service representative 112 or dispatcher 114. Work order/technician information input terminal 102 may also be provided for a user. Both subscriber service request input terminal 100 and work order/technician information input terminal 102 are coupled to server 116. Server 116 may comprise map generation means 118, service request/work order processing means 120, routing means 122, and a database 124. In one embodiment, a separate work order generating means may be provided. In another embodiment, a separate work order processing means may be provided to process technician information. Other processors and databases may be provided as required. In the preferred embodiment, map generation means, service request/work order processing means 120, routing means 122 and database 124 are integrated applications running under a common operating system, such as Windows 95 or UNIX.

Display 104 is provided for displaying information to a user. A plurality of displays may be provided throughout the system. In a preferred embodiment, display 104 comprises an input window (not shown) and a map window (not shown). Other windows may be provided as necessary.

Subscribers 108 are linked by communications system 106 to service representative 112, dispatcher 114, and a team of technicians 110. Communications system 106 may be a standard telephone, a cellular phone, a facsimile, pager, e-mail, or any other means of communicating. Technicians may communicate over communications system 106 by telephone, cellular telephone, radio, wireless computer, or any other means of communicating. In a preferred embodiment, subscribers 108 communicate solely with service representative 112, while the technicians 110 communicate primarily with dispatcher 114. Occasionally, the technicians 110 may be required to communicate with subscribers 108 for various reasons, such as to confirm an appointment, to change an appointment, to get directions, etc.

In a preferred embodiment of the invention, service representative 112 may comprise an automated call answering system 113 to record and enter subscriber service requests. For example, by using the numeric keypad on a telephone, a subscriber 108 may be able to request a service call by navigating a series of menus without actually speaking to service representative 112. Service representative 112 may be required to contact subscribers 108 in the event of scheduling difficulties or for other reasons. In an alternate embodiment, service representative 112 may further comprise an e-mail mailbox that receives and processes electronic service request via e-mail.

In a preferred embodiment, team of technicians 110 may be able to access server 116 directly in order to enter work order information.

Subscribers typically communicate service requests to service representative 112. These service requests may include reception difficulty, disconnection requests, addition or deletion of channels, or any other service request. Technicians typically communicate work order status, including completed, in service, or not completed; location information; scheduling information; or any other required information. In a preferred embodiment, technician location may be tracked using a global positioning system sensor, which transmits the technician location to the server directly. Other means of transmitting location or data to the server may also be used.

Figure 2:
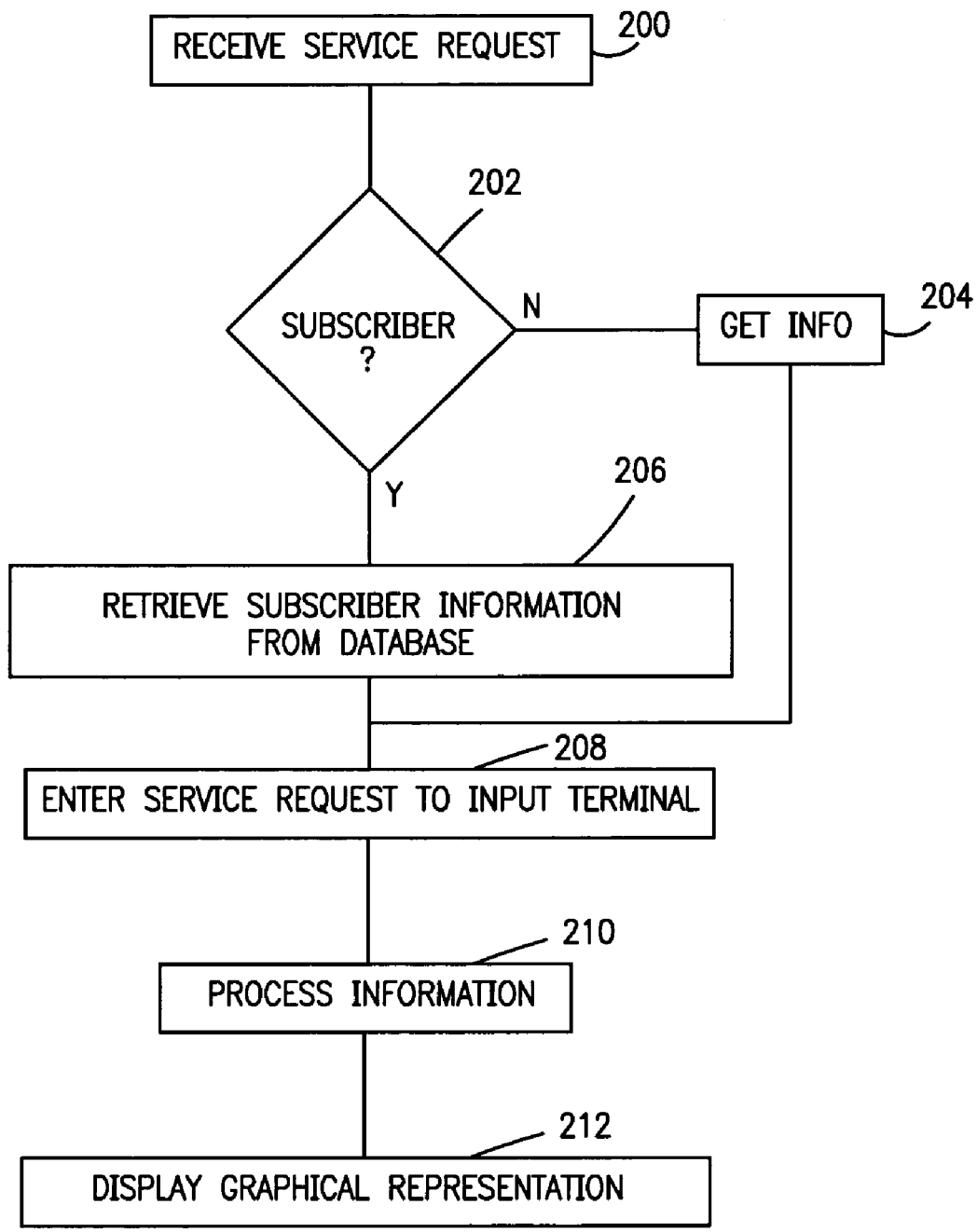
FIG. 2 shows a representation of the map display window.

Referring to FIG. 2, which depicts a flowchart of the method for computer-aided technician dispatch, in step 200, a service request is received. Typically this will be from a subscriber or a potential subscriber, but it may also be from a technician. In step 202, the service representative determines whether or not the service request is for a current subscriber or not. If it is not, in step 204 the service representative may have the potential subscriber give necessary subscriber information, which may include name, address, telephone number, etc. If the service request is from a current subscriber, in step 206, the server retrieves the subscriber information from the database. In step 208, the service request is entered into the service request input terminal 100. Next, in step 210, the information is processed, and a graphical representation of the service request is created. In order to develop this, the service status of the service request may be considered. Once the graphical representation is complete, the map and graphical representations of service requests are displayed in step 212.

Referring again to FIG. 1, in a preferred embodiment, once the service request information is entered into input terminal 100, a work order is created. A work order is a compilation of all information for use either by team of technicians 110, dispatcher 114, or service representative 112. Typically, a work order may be assigned a number to facilitate reference by team of technicians 110 or dispatcher 114. Work order information may be entered, updated, deleted, or otherwise accessed through work order input terminal 102.

Figure 3:
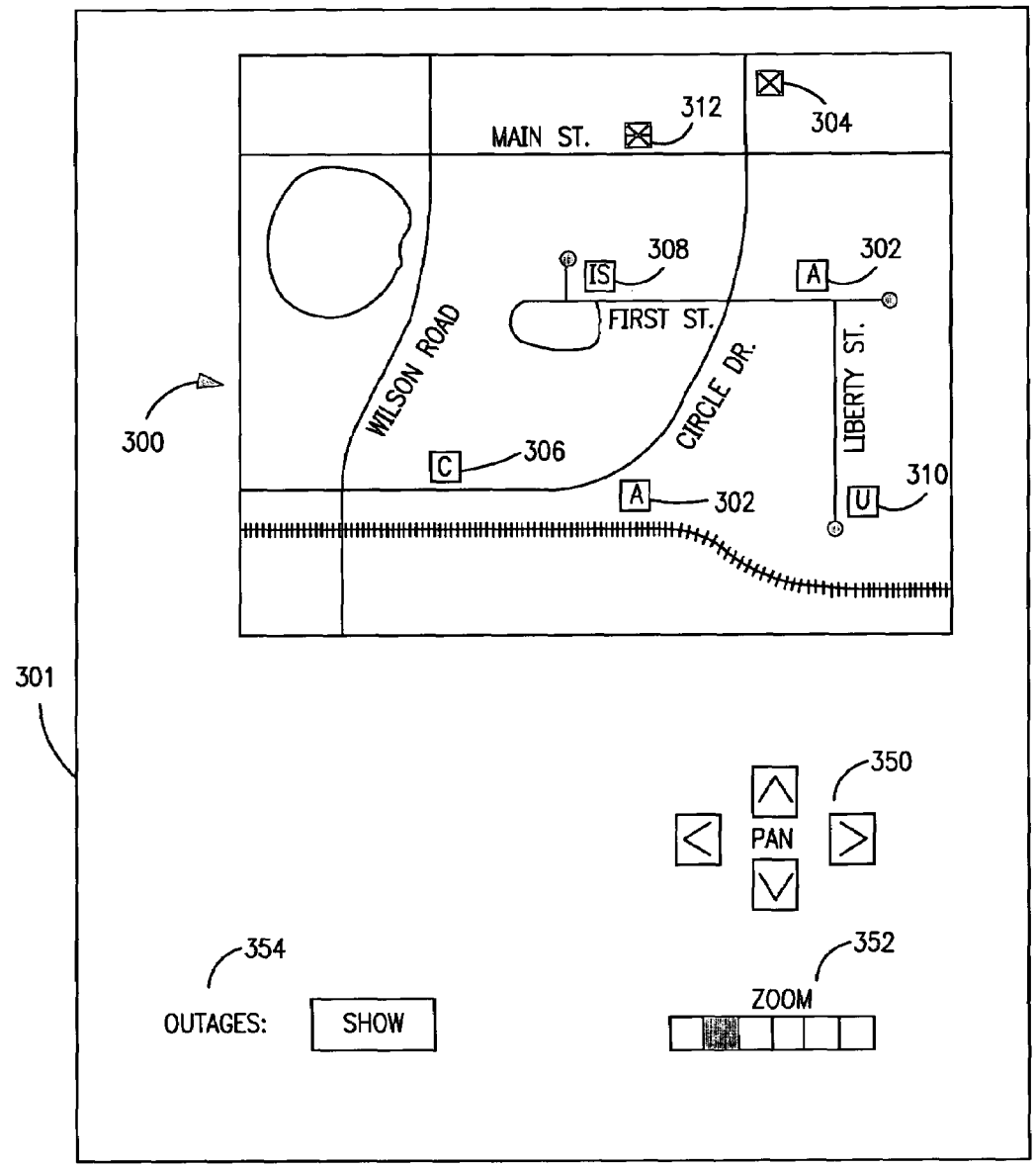
FIG. 3 illustrates an example of a digitized map used in accordance with one embodiment of the present invention.

Referring now to FIG. 3, which illustrates an example of a display means 301 comprised of a digitized map in accordance with one embodiment of the present invention, a representation of a service area is shown in map window 300. Map window 300 may be moved up, down, left, or right using the pan buttons 350. Further, the amount of the service area that is displayed in map window 300 may be adjusted using zoom control 352. Zoom control 352 may provide a plurality of levels of detail. Service requests are represented in map window 300 by using graphical representations of the service request. In a preferred embodiment, icons 302, 304, 306, 308, 310, and 312 are used as graphical representations. A different icon may be used to represent the various statuses of a service request. For example, a service request that is assigned to a technician may be shown as 302. A service request that has been canceled may be shown as 304. A service request that has been completed by a technician may be shown as 306. A service request that is currently being serviced by a technician may be shown as 308. A service request that is unassigned may be shown as 310. A service request that represents an outage may be shown as 312. Other graphical representations may be used to show these and other service request statuses.

Other information may be conveyed through the properties of the graphical representations of the service requests. For instance, the color of the graphical representation of the service request may mean different things. A red graphical representation of a service request may indicate that the technician is late for a scheduled appointment; a flashing graphical icon may indicate that a technician is spending more time that was allotted for a certain service request, etc. Other properties of the graphical representations may be used to convey other information as well.

A user may have the ability to have all outages that have been reported and entered displayed at once using the Outages: Show button 354. This will cause outages, indicated by graphical representation 312, to be shown on the map.

Figure 4:
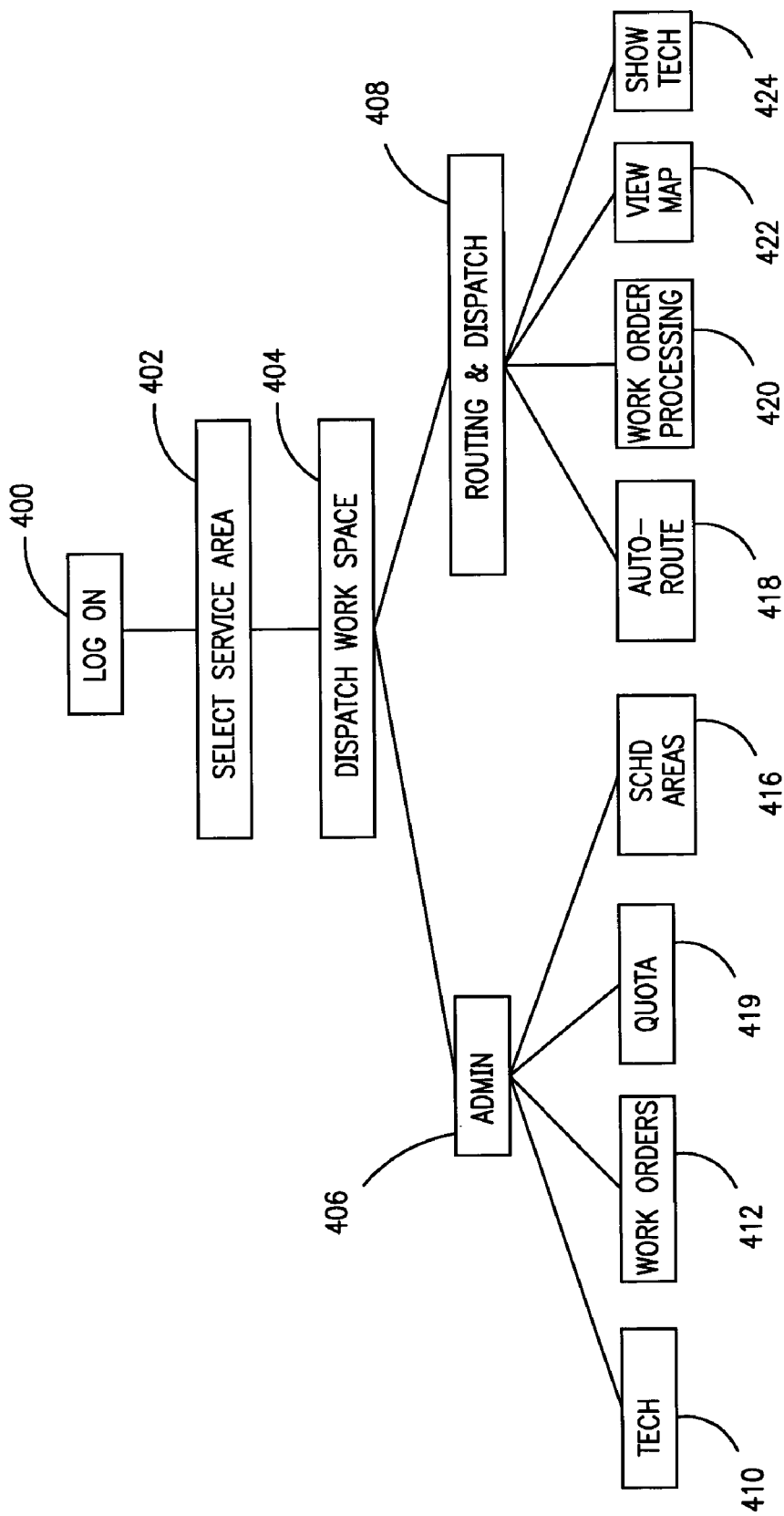
FIG. 4 shows a tree diagram of the menu structure according to one embodiment of the present invention.

Referring to FIG. 4, which shows a tree diagram of the menu structure according to one embodiment of the present invention, the system starts by having the user log on to the system 400. In this step, the user may be required to enter a user name and password. Once this is complete, the user selects a service area or fulfillment center in step 402. This may be especially useful when one service center serves several service areas. Once the fulfillment center is chosen, the user is launched into the dispatch work space 404. From this platform, the user may select either the Admin. Mode 406 or the Dispatch Mode 408. The Admin. Mode 406 allows the user to run administrative functions, such as functions dealing with technicians 410, work orders 412, quota 419, which are defined as the effort needed to complete a work product or task on a work order, or scheduled areas 416, which are defined as the boundaries that subdivide a service area. Each Admin. Mode 406 area will be discussed in detail below.

Figure 5:
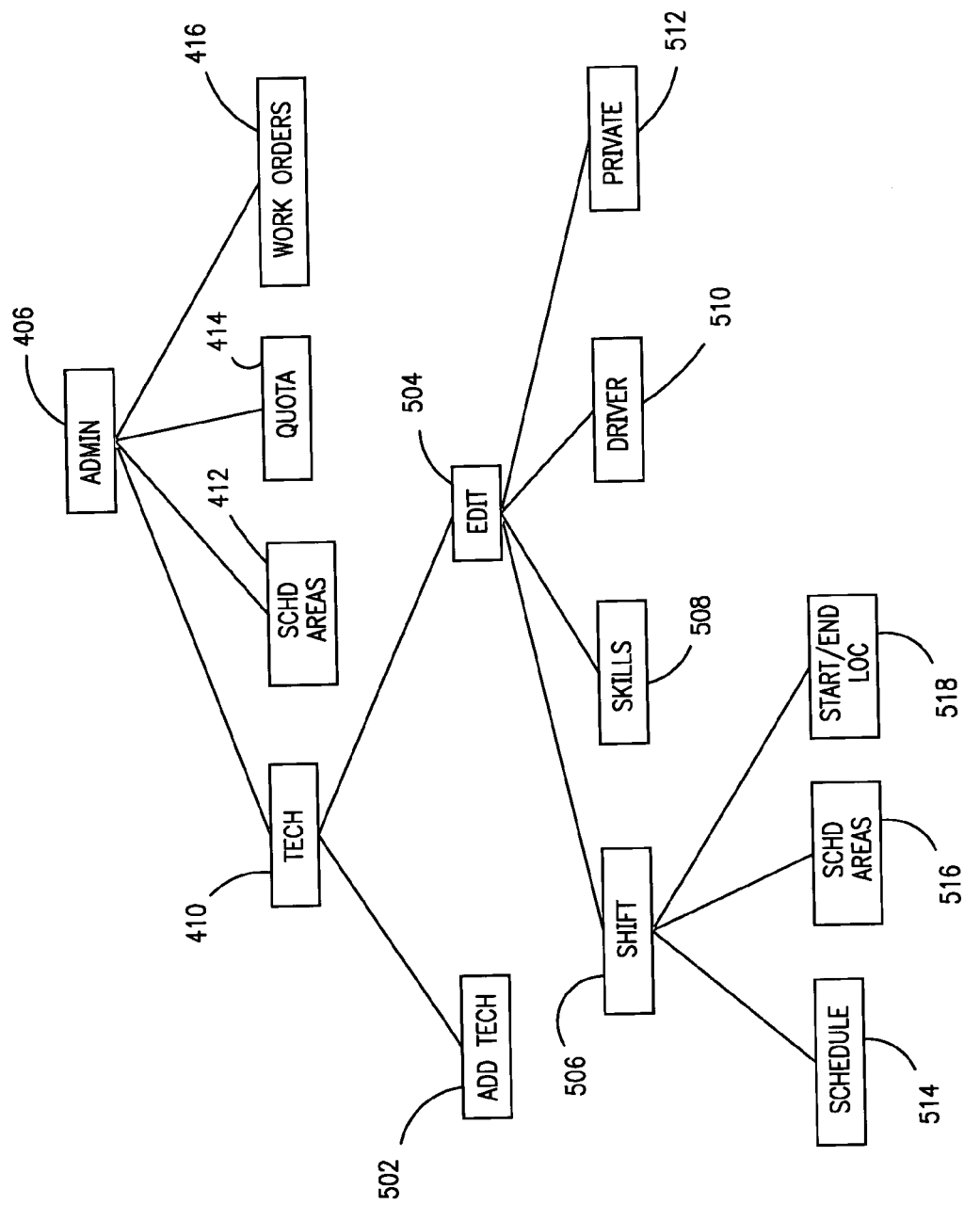
FIG. 5 shows a tree diagram of the Admin. Mode menu structure.

Referring to FIG. 5, which shows a tree diagram of the Admin. Mode menu structure, Techs window 410 gives the user two options. They are the Add Tech option 502 and the Edit option 504. The Add Tech option 502 allows the user to enter information about a technician, which may include the technician's name, phone number, start date, and termination date. Other information may be added if required.

The Edit option 504 provides the ability to edit information that already exists. From Edit 504, the user may edit Shift information 506, edit Skills information 508, edit Driver information 506, and edit Private information 512. From the edit shift information 510 the user may enter and update information dealing with the technician's Scheduled Hours 514, the Scheduled Areas 516 that the technician may be assigned jobs from, and the daily Start/End Location 518 for a technician. The Start/End Location 518 information may be entered as an address, as a longitude/latitude position, or any other positioning system.

The edit Skills information 508 allows the user to update and add new skills to a particular technician's record. This may involve assigning a number of points to a technician based on his or her assessed skill level. The edit Driver information 510 allows the user to enter information such as a commercial driver license information, height, weight, eye color, birth date, gender, etc. Comments may be added as necessary.

The edit Private information 512 may be used to record miscellaneous comments about a particular technician.

The Admin. Mode 406 also allows a user to define Schedule Areas 416. As discussed earlier, schedule areas are defined as the boundaries that subdivide a service area. These subdivisions may be defined by a franchise tax area, zip codes, geographical codes, or any other means for dividing a service area. The user may define the schedule areas based on these methods. New schedule areas may be added as appropriate.

Quota 414 may be set in Admin. Mode 406. The user may assign a particular number of points to a particular task depending on the difficulty of the task. For example, connecting a customer to cable in a pre-wired apartment may be worth 20 points, indicating a low skill requirement and a low time requirement, while installing cable to a home that has not been pre-wired may be worth 50 points. These points are used to determine how many jobs a technician may complete in a given work day, and the amount of skill required to complete them.

Figure 6:
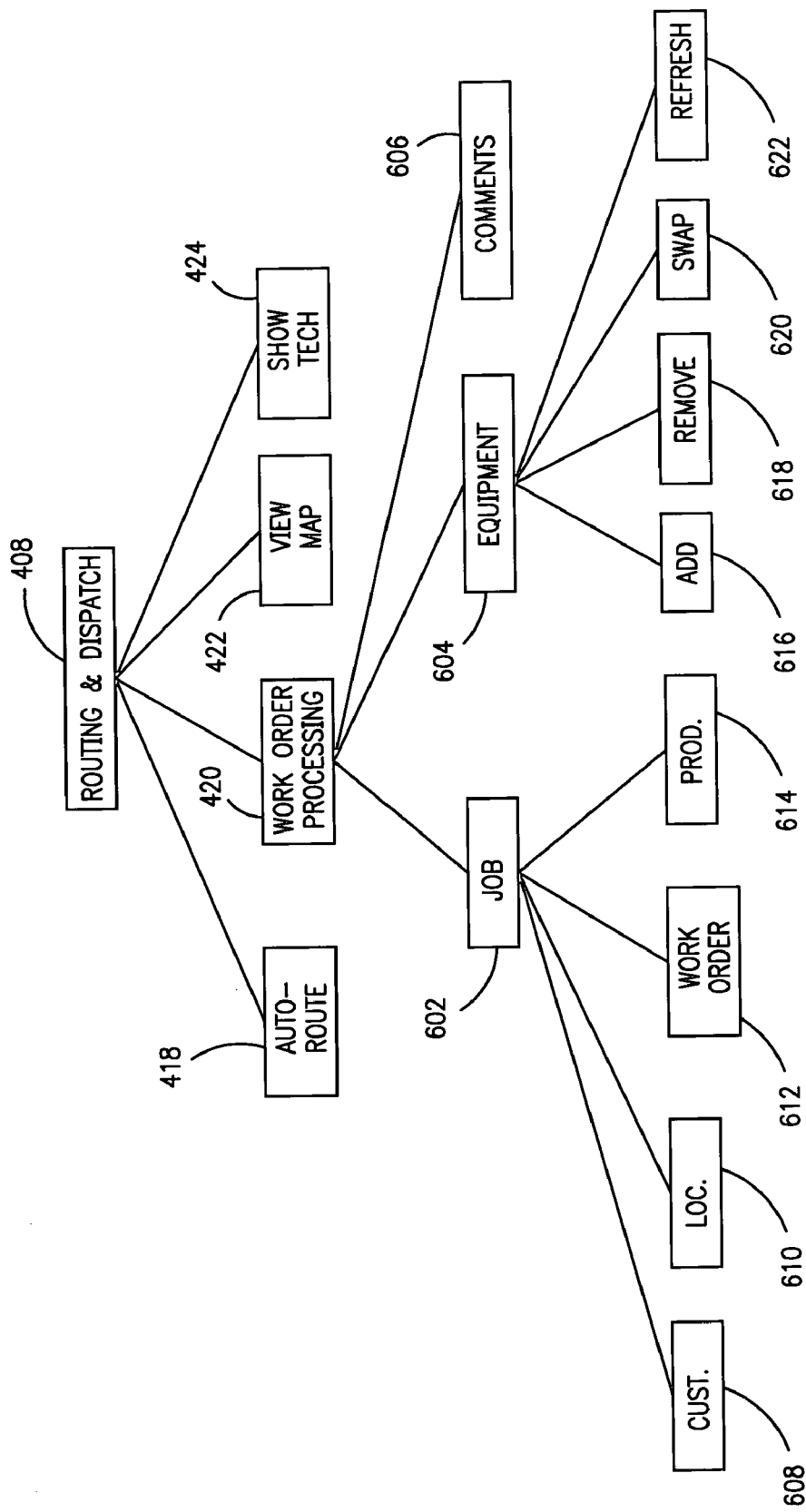
FIG. 6 shows a tree diagram of the Routing and Dispatch menu structure.

Referring to FIG. 6, which shows a tree diagram of the Routing and Dispatch menu structure, from the Routing and Dispatch window 408, the user may use the automatic routing feature 418, enter the Work Order Processing window 420, or view the fulfillment center map 422. The automatic routing feature 418 is used to automatically route unassigned work orders or service requests to available technicians. If the user does not desire to use the automatic routing feature 418, the user may manually assign the service request or work order from the Routing and Dispatch window 408.

From the Routing and Dispatch window 408 the user may select the Work Order Processing window 420. This window allows the user to choose to update Job information 602, Equipment information 604, and Comments 606. From the Job information window 602, the user may enter and edit information regarding the particular work that was done or is pending, what products or services have been requested and their current statuses, and the current products that the subscriber has. The user may also launch into the Customer window 608, the Service Location window 610, the Work Order window 612, and the Products window 614.

Customer window 608 allows the user to update or enter information such as the customer type (e.g., regular, corporate, school, etc.), customer language preference, customer birth date, customer title, customer name, customer social security number, customer phone number, and any other information that may be required. Service Location window 610 allows the user to update or enter information regarding a particular service location, such as the address of the service location, postal route information, service location unit type (e.g., apartment, house, etc.) Work Order window 612 displays a schedule for a particular technician for a given time period, and may be used to cancel assigned work orders. Products window 614 allows unrequested equipment to be added to a customer's records.

From the Equipment information window 604, the user may update information regarding the subscriber's current equipment and any requested equipment. The user may Add a converter box 616, Remove a converter box 618, Swap a converter box 620, or refresh a converter box 622.

Comments window 606 allows comments to be entered as necessary.

The user may also view the map 422 from the Routing and Dispatch window. This feature may be available from every menu for convenience. From the view map 422 option, the user may select a particular service request or work order that has been plotted on the map and have the Work Order Processing window 420 for that particular request displayed. Referring to FIG. 3, the user may also view outages by selecting the "Show Outages" option 354.

Referring again to FIG. 6, the user may also select the "Show Tech" option 424 from the Routing and Dispatch window 408. This will bring up the map window and show all jobs that are assigned to a particular technician.

Figure 7:
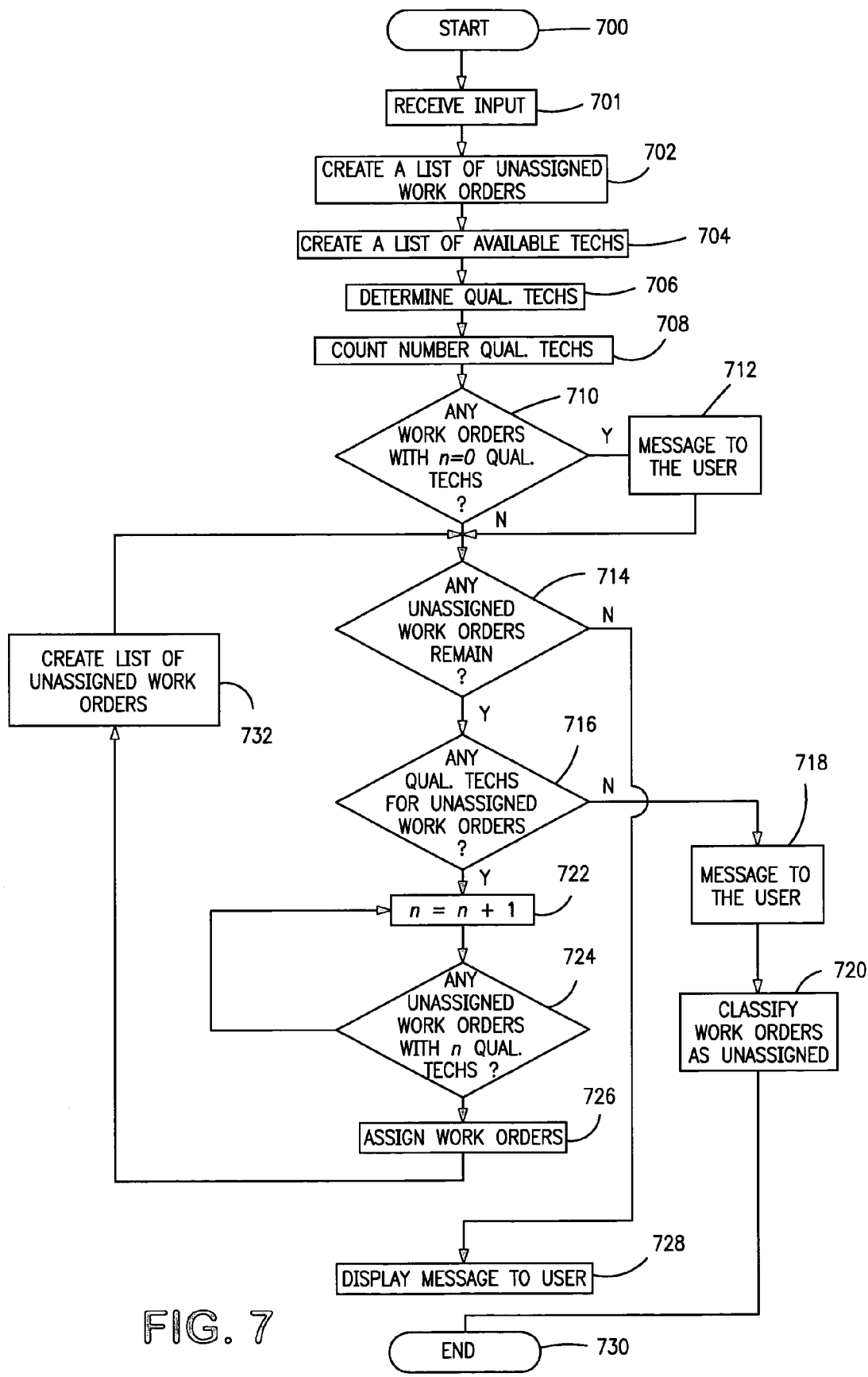
FIG. 7 illustrates a preferred embodiment of the routing process.

Referring now to FIG. 7, which is a diagram representing the routing process, first the input is received in step 701. Next, a list of all unassigned work orders is created in step 702. This may be done for a particular day, or any other time period. Next, in step 704, a list of available technicians to complete the work orders, which, as discussed earlier, contain service request information and may include additional information, is created. In step 706, a determination of the technicians that are qualified to complete the pending work orders is made. This may be done based on a skill rating that each technician may be assigned, and may include comparing the required time for the work order to a technician's available time. This list is temporarily associated with the work order record. Next, in step 708, the number of qualified technicians is counted and this number x is also temporarily associated with the record. At the completion of step 708, each work order record should have a corresponding list of qualified technicians and number of qualified technicians associated with it.

In step 710, a determination is made as to whether or not there are any work orders that do not have any qualified technicians. To make this determination, a counter n which is initially set to 0 is compared to the number of qualified technicians associated with each work order, generated in step 706. If there are any work orders that do not have any qualified technicians, a message indicating such is sent to the user in step 712.

If there is at least one qualified technician for each work order, or a message has been sent to the user in step 712, a determination is next made as to whether or not any unassigned work orders remain to be assigned in step 714. If there are not, a message indicating such is displayed in step 728 and the process is completed in step 730. If there are, in step 716 a determination is made of whether or not any of the unassigned work orders have qualified technicians still available. If there are not any qualified technicians available (i.e., all of the available time for the qualified technicians is allocated), a message indicating this is sent to the user via a display in step 718, the remaining work orders are classified as "unassigned" in step 720 and the process is completed in step 730. If there are qualified technicians available for the unassigned work orders, in step 722 the counter n, which was originally set at 0, is incremented by 1. A determination is then made in step 724 if there are any work orders that have n qualified technicians associated. If there are not, the process loops back to step 722. If there are, the process assigns the work orders having n qualified technicians available in step 726. Next, in step 732, the process again creates a list of unassigned work orders. This list will not include the work orders previously assigned by step 726. The assignment in step 726 will be discussed in view of FIG. 8. Once the work orders having n qualified technicians are complete, the process loops back to step 714.

Figure 8:
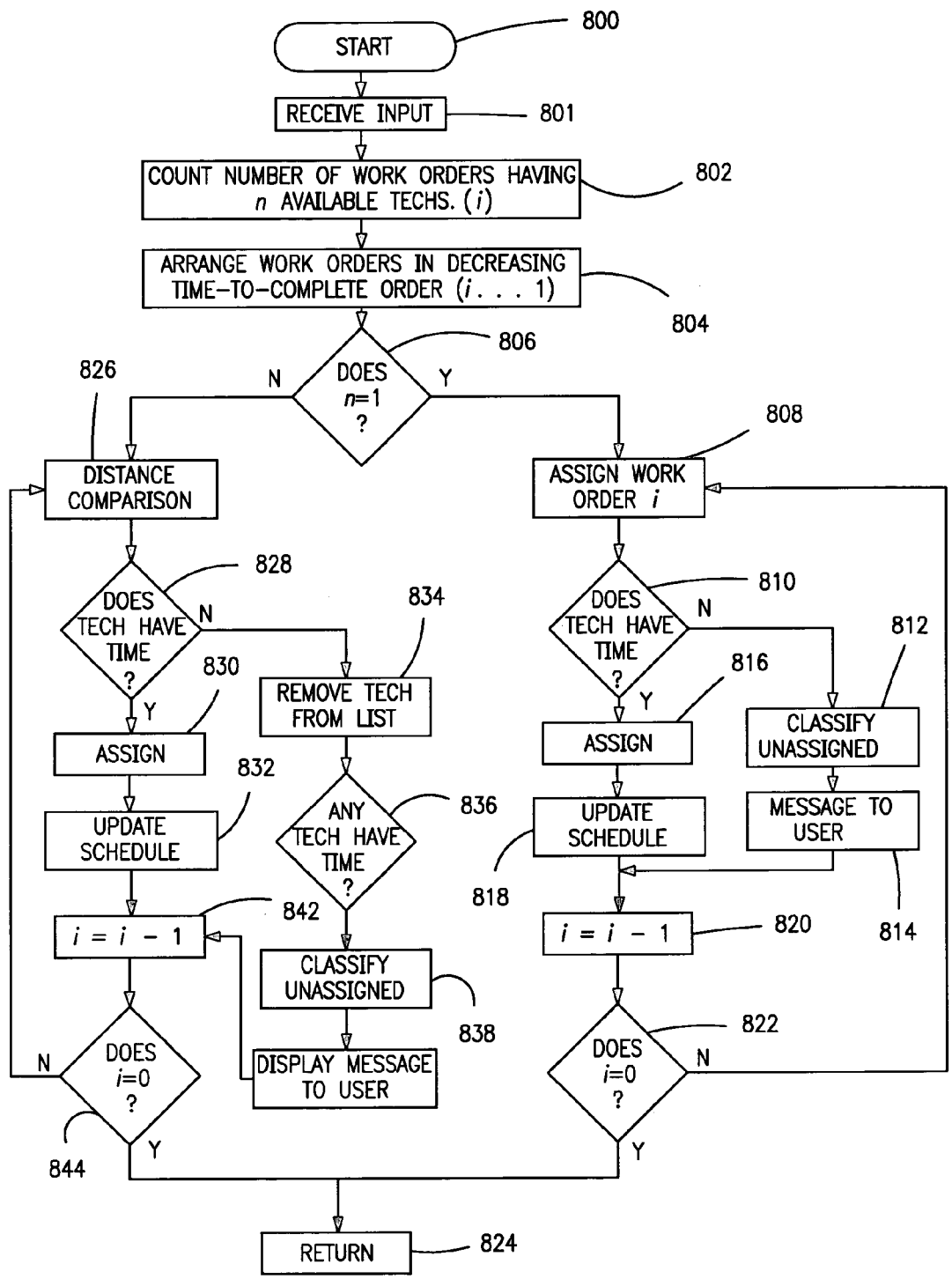
FIG. 8 illustrates the assignment process according to one embodiment of the invention.

Referring to FIG. 8, which illustrates the assignment process, in step 801, input is received. In step 802, the process counts the number of work orders having n qualified technicians available and then assigns this a number to a variable, i. In step 804, the process arranges the work orders in decreasing time-to-complete order. In this step, each work order is assigned a number from i to 1, where the work order that takes the longest to complete is assigned i and the work order that takes the shortest amount of time is assigned 1. The process, in step 806, then determines whether the number of qualified technicians, n, is equal to 1. If it is, the process, in step 808 starting with work order i assigns the work orders to the qualified technicians. If the technician does not have time available to complete the work order, determined in step 810, the work order is classified as "unassigned" in step 812 and, in step 814, a message is sent to the user indicating such. If it is determined in step 810 that the technician does have enough available time to complete the work, the work order is classified as "assigned," in step 816, and the technician's schedule is updated in step 818. In step 820, i is decremented by 1, and in step 822, if i=0, indicating that all work orders having n technicians have been reviewed, the process returns to step 732 of FIG. 7. If i is not equal to 0, the process loops back to step 808 to continue reviewing these work orders.

If, in step 806, n does not equal 1, distance will determine which of the at least one qualified technician will be assigned the work order. In step 826, a distance comparison for work order i is made. The comparison is made between work order i's location and the qualified technicians' assigned start and end points, as well as to other previously assigned work orders. The technician having the minimum distance in any of these comparisons will be assigned the work order. In step 828, a determination is made as to whether or not the technician has time available to complete the work order. If he does, in step 830, the work order is classified as "assigned" and in step 832 the technician's schedule is adjusted to include the work order. If the technician does not have time available to complete the work order, that technician is removed from the qualified technician list for work order i in step 834. A check is then made in step 836 to determine if any of the qualified technicians have available time to complete the work order i. If they do not, the work order is classified as "unassigned" in step 838. In step 840, a message is displayed to the user indicating such. If at least one technician has available time, the process loops back to step 826. Once the work order is classified as either "assigned" or "unassigned," the process decrements i by 1 in step 842. In step 844, if i=0, indicating that all work orders have been reviewed, the process, in step 826, returns to step 714 of FIG. 7. If i is greater than 0, the process loops back to step 826.

As an example of how this process works according to one embodiment of the invention, assume that there are 6 work orders ($W_1$, $W_2$, $W_3$, $W_4$, $W_5$, and $W_6$) to complete and 3 technicians ($T_1$, $T_2$, and $T_3$) available. Referring to FIGS. 7 and 8 and Table 1, step 702 would return the data in the column entitled "Unassigned Work Order" and step 706 would return the data in the column entitled "Qualified Technicians." Next, the step 708 would return the data in the column entitled "Number of Qualified Technicians." The data in these columns would then be associated with the particular work order(s). For instance, work order $W_2$ would have $T_1$ and $T_2$ associated with it, as well as the number of technicians that can complete the job, which is 2.

TABLE 1

| Unassigned Work Order (time to complete) | Qualified Technicians | Number of Qualified Technicians |
|---|---|---|
| $W_1$ (4) | $T_1$ | 1 |
| $W_2$ (3) | $T_1$, $T_2$ | 2 |
| $W_3$ (2) | $T_2$ | 1 |
| $W_4$ (4) | $T_1$, $T_2$, $T_3$ | 3 |
| $W_5$ (1) | $T_1$, $T_2$ | 2 |
| $W_6$ (5) | None | 0 |

Next, in step 710, the process determines that $W_6$ does not have any qualified technicians. This would cause a message to be sent to the user in step 712. Since there are unassigned work orders (step 714), and there are qualified technicians for the unassigned work orders (step 716), the process looks at work orders with n=1 qualified technicians (step 724). Thus, the assignment process begins (step 726). Referring to FIG. 8 and Table 1, there are two work orders that have n equal to 1, $W_1$ and $W_3$. Thus, in step 802 i is equal to 2. The result of step 804 would be $W_1$ followed by $W_3$, with $W_1$ assigned i=2 and $W_3$ assigned i=1. Assuming that both technicians had available time to complete the work orders, step 816 would first assign $W_1$ to $T_1$, and, after decrementing i in step 820 and looping back to step 808, step 816 would then assign $W_3$ to $T_2$.

Next, the process would loop back to step 732 of FIG. 7 and would look for work orders with n=2. Referring to Table 1, there are two work orders, $W_2$ and $W_5$, that have two qualified technicians. Step 804 of FIG. 8 would put the work orders in the order $W_2$ followed by $W_5$.

The process, in step 826, considers the distance from the start location, the end location, or any previously assigned work order locations to the work order location in question. For example, referring to Tables 2 and 3, the distance data relative to the two qualified technicians for $W_2$ is considered. Since the minimum distance for $W_2$ from a previous point is 5 miles (from $W_1$), $T_1$ is selected to complete $W_2$.

TABLE 2

| Technician 1 | |
|---|---|
| Location | Miles To $W_2$ |
| $W_1$ | 5 |
| Start Location | 16 |
| End Location | 20 |

TABLE 3

| Technician 2 | |
|---|---|
| Location | Miles To $W_2$ |
| $W_3$ | 7 |
| Start Location | 6 |
| End Location | 14 |

Once a technician is selected, the process confirms that the selected technician has available time to complete the work order (step 828). Here, assuming $T_1$ that $T_1$ has available time (at least 3 hours) to complete $W_2$, $T_1$ is assigned $W_2$ (step 830) and $T_1$'s schedule is updated to reflect this (step 832). After i is decremented (step 842), the same type of analysis is repeated for $W_5$.

The process then considers the work orders that have n=3 qualified technicians available using a similar type of analysis.

Although the present invention has been described in detail, it should be understood that various changes, substitutions, and alterations can be made without departing from the intended scope as defined by the appended claims.

We claim:

1. A system for handling a plurality of unassigned service requests, the system comprising:

means for receiving the plurality of service requests which are upon receipt are unassigned;

means for using programming to process the plurality of unassigned service requests for the purpose of assigning to each of the plurality of unassigned service requests one or more of a plurality of technicians as a function of at least a skill level of each of the plurality of technicians, a skill level required by each of the plurality of unassigned service request; means for considering prior service requests assigned to each of the plurality of technicians via the programming; and an amount of time to complete each of the plurality of unassigned service requests;

means for displaying an indication if one or more of the plurality of unassigned service requests remain unassigned as a result of processing performed via the programming; and means for displaying an indication of a status of one or more service requests that have been assigned to at least one technician via the programming.

2. The system as recited in claim 1, wherein the means for displaying an indication of a status of one or more service requests that have been assigned to at least one technician via the programming comprises a means for displaying a map showing a geographic location of the one or more service requests that have been assigned to at least one technician via the programming.

3. The system as recited in claim 1, wherein the skill level required by each of the plurality of unassigned service requests is represented by a number of points based upon a difficulty assessment of the unassigned service request.

4. The system as recited in claim 1, wherein the means for displaying an indication of a status of one or more service requests that have been assigned to at least one technician via the programming comprises a means for displaying a geographic location of one or more of the plurality of technicians.

5. The system as recited in claim 1, wherein the means for displaying an indication of a status of one or more service requests that have been assigned to at least one technician via the programming comprises a means for displaying an icon to represent a cancellation of a service request that has been assigned to at least one technician via the programming.

6. The system as recited in claim 1, wherein the means for displaying an indication of a status of one or more service requests that have been assigned to at least one technician via the programming comprises a means for displaying an icon to represent a type of each of the one or more service requests that have been assigned to at least one technician via the programming.

7. A method for handling a plurality of unassigned service requests, comprising:

receiving the plurality of service requests which are upon receipt are unassigned;

using programming for the purpose of assigning to each of the plurality of unassigned service requests one or more of a plurality of technicians as a function of at least a skill level of each of the plurality of technicians, considering a skill level required by each of the plurality of unassigned service requests, considering prior service requests assigned to each of the plurality of technicians via the programming, and an amount of time to complete each of the plurality of unassigned service requests;

displaying an indication if one or more of the plurality of unassigned service requests remain unassigned as a result of processing performed via the programming; and displaying an indication of a status of one or more service requests that have been assigned to at least one technician via the programming.

8. The method as recited in claim 7, wherein displaying an indication of a status of one or more service requests that have been assigned to at least one technician via the programming comprises displaying a map showing a geographic location of the one or more service requests that have been assigned to at least one technician via the programming.

9. The method as recited in claim 7, wherein the skill level required by each of the plurality of unassigned service requests is represented by a number of points based upon a difficulty assessment of the unassigned service request.

10. The method as recited in claim 7, wherein displaying an indication of a status of one or more service requests that have been assigned to at least one technician via the programming comprises displaying a geographic location of one or more of the plurality of technicians.

11. The method as recited in claim 7, wherein displaying an indication of a status of one or more service requests that have been assigned to at least one technician via the programming comprises displaying an icon to represent a cancellation of a service request that has been assigned to at least one technician via the programming.

12. The method as recited in claim 7, wherein displaying an indication of a status of one or more service requests that have been assigned to at least one technician via the programming comprises displaying an icon to represent a type of each of the one or more service requests that have been assigned to at least one technician via the programming.

* * * * *